(No Model.) 2 Sheets—Sheet 1.
J. ROBB.
CARDING MACHINE FOR MAKING MOTTLED ROVINGS.
No. 395,632. Patented Jan. 1, 1889.
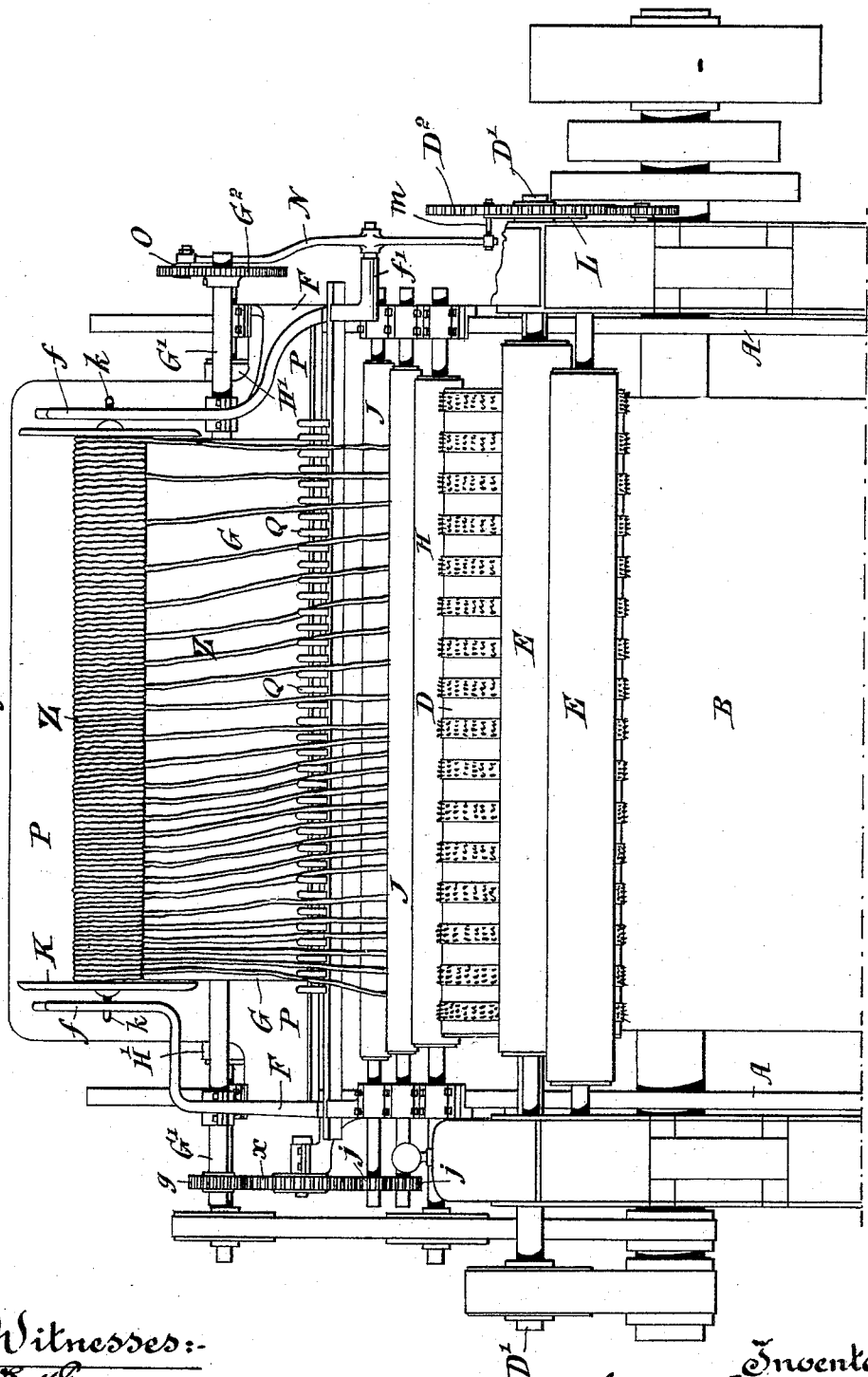

(No Model.) 2 Sheets—Sheet 2.
J. ROBB.
CARDING MACHINE FOR MAKING MOTTLED ROVINGS.
No. 395,632. Patented Jan. 1, 1889.
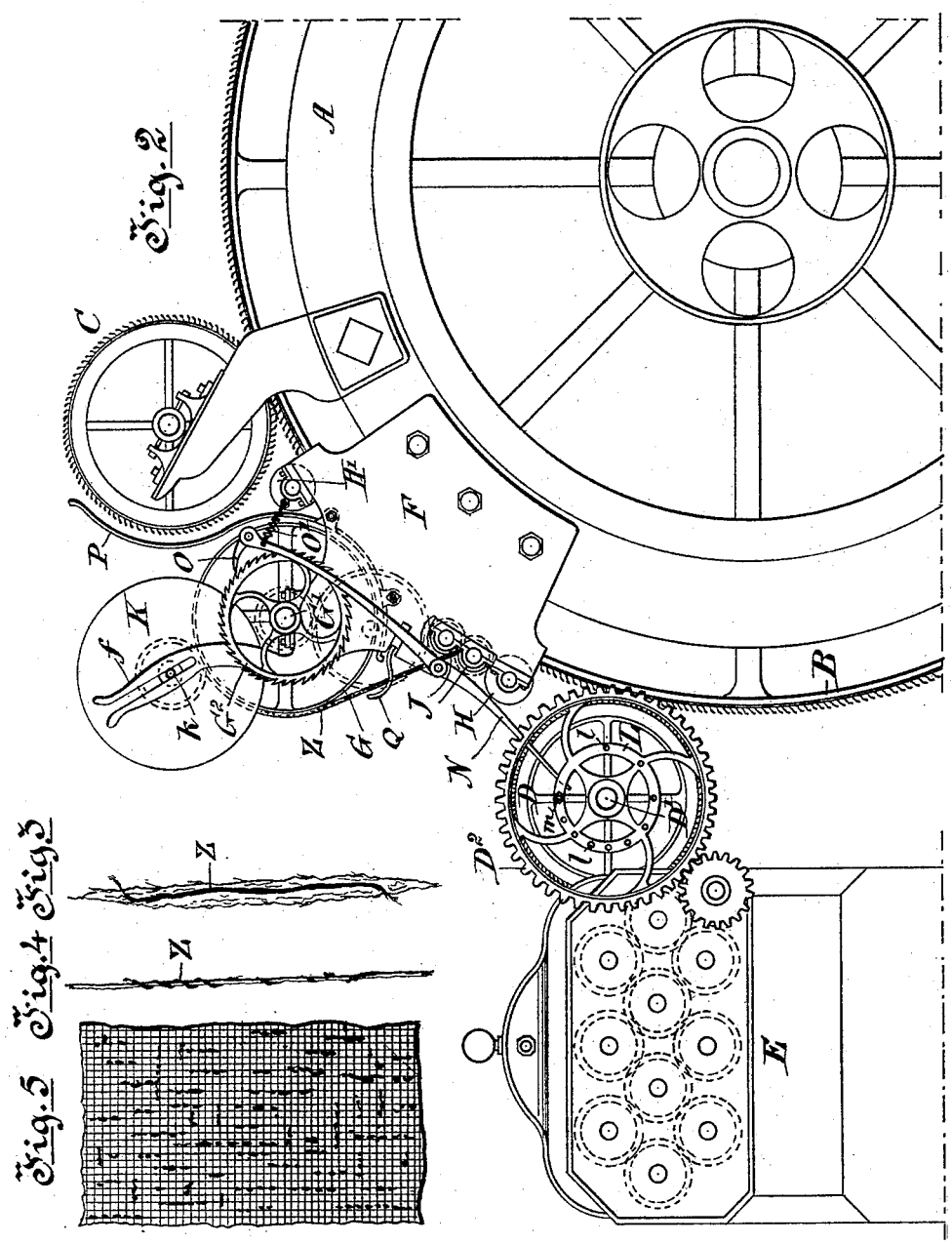
Witnesses:
O. W. M. Evans.
T. J. Sears.
Inventor
John Robb
Per Attys:

UNITED STATES PATENT OFFICE.

JOHN ROBB, OF OXFORD, NOVA SCOTIA, CANADA.

CARDING-MACHINE FOR MAKING MOTTLED ROVINGS.

SPECIFICATION forming part of Letters Patent No. 395,632, dated January 1, 1889.

Application filed April 22, 1887. Serial No. 235,815. (No model.) Patented in Canada May 6, 1887, No. 26,619.

*To all whom it may concern:*

Be it known that I, JOHN ROBB, of Oxford, in the county of Cumberland and Province of Nova Scotia, Canada, have invented certain new and useful Improvements in Carding-Machines for Making Mottled Rovings, (for which I have obtained a patent in the Dominion of Canada, No. 26,619, bearing date the 6th of May, 1887;) and I do hereby declare that the following is a full, clear, and exact description of the same.

My invention has for its object to provide, for application to the carding-machines of any woolen factory, mechanism acting upon the lap in such manner that when the latter has been divided into slivers and the rovings formed therefrom have been spun and woven, the complete fabric will present a mottled appearance, due to the presence in it of broken lines or dots of a different color or shade from the fabric, distributed irregularly through it, the invention being specially applicable to homespuns, tweeds, and like material.

The mechanism now about to be described will operate to produce the above effect by introducing intermittently or otherwise into the lap of wool going through the finishing-card portions of a finished roving of a different color or shade, and allowing such roving to go with the lap through the regular treatment by the doffer and rub-rolls, whereby the rovings become pressed into the slivers of the lap and will, after the material has been spun, form an integral part of the same.

The special mechanism for accomplishing the above object is as follows: Between the doffer and the fancy of the finishing-card I secure on the frame of the main cylinder a frame-work, in which is carried the axle of a cylinder, to which intermittent motion is imparted from the doffer by means of a pivoted lever and pawl acting upon a ratchet-wheel mounted on such axle. In forks formed in the said frame-work rests the spindle of a spool carrying the finished rovings, with which the cylinder above mentioned is always in contact, such cylinder acting as a feed to conduct the rovings to leading-rolls operated intermittently simultaneously with the cylinder, whence they will pass to the doffer and thence to the rub-rolls, where they will be thoroughly pressed into the substance of each sliver. Guides are provided for keeping the rovings apart, and a fender is interposed between the fancy and the spool to prevent any accidental intermixture of the particles of the rovings and the lap.

For full comprehension of my invention reference must be had to the annexed drawings, forming part of this specification, in which—

Figure 1 is a view of that end of a carding-machine at which the doffer is situated, showing my invention in place; Fig. 2, a side view of same. Fig. 3 shows a fragment of the lap with a section of the roving pressed into it; Fig. 4, the same, showing the roving incorporated by spinning; and Fig. 5, the finished woven fabric.

Similar letters of reference indicate like parts.

A is the main side framing of the carding-machine; B, the main cylinder; C, the fancy; D, the doffer mounted on shaft D', and E the series of rub-rolls, all constructed, arranged, and operating as usual, and to which no further special reference will be made.

F F are side plates or standards secured to the side frames, A, and having forked ends $ff$, between which rests the spindle $k$ of the spool or bobbin K, carrying the finished rovings Z.

In the plates F F are journaled the ends of the shaft G', carrying the drum or cylinder G, also the ends of the spindles of the wipe-rolls H H', which are introduced to help condense the lap before and after the roving is introduced, the roll H' acting only on the lap and the one, H, upon lap and roving, it being situated between the leading or feed rolls J J, which are also journaled in plates F F, and the doffer.

On the pinion $D^2$, mounted on the doffer-shaft D' and operating the rub-rolls E, is formed a ring or plate, L, having formed in it with different intervals between them perforations $ll$, in any one or number of which may be set a pin or pins, $m$. This pin or pins will, as the pinion $D^2$ revolves come into contact with and actuate one end of the lever N, pivoted to the projection $f'$ from one of the standards F, on the other end of lever N being secured a pawl, O, held normally out of mesh with the ratchet-wheel G² on the shaft G' by the spring O', but put into mesh with G² and imparting to it intermittent rotary motion by the action of the pin $m$ upon the lever N. The leading-rolls J J receive intermittent rotary motion simultaneously with the cylinder G through any suitable system of gears, $g\ x\ j\ j$.

P is a fender extending across the face of the cylinder A, between cylinder G and fancy C, and secured at both ends to the standards F; and Q Q are guides formed on a bar carried in the standards F F.

The operation of the mechanism is as follows: A lap of wool differing in color or shade from that forming the ground of the fabric having been previously treated in the usual way to produce plain rovings is wound upon the spool or bobbin K, the spindle of which rests in the forks $f\ f$, the rovings themselves resting on the cylinder G, with which they are in constant contact, their several ends being inserted between the leading-rolls J J, ready to be fed forward onto the lap on the cylinder B. The revolution of the doffer will cause the pin or pins set in the doffer-pinion D² to come in contact with and actuate the lever N, causing the pawl O to engage ratchet G² and impart to it a certain amount of rotary motion, until by the rotation of pinion D² the end of the lever N is released and the pawl O drawn out of mesh with wheel G² by the spring O'. The leading-rolls J J are actuated through the gears $j, j, x,$ and $g$ simultaneously with and as long as the cylinder G, and these together act to draw off the rovings wound on the bobbin K and lay them into the lap, (the cylinder G giving evenness of tension,) so long as the revolution of the rolls and cylinder continues. As soon as these stop, the portions of the rovings fed out are torn from the main strands and are carried along with the lap by the main cylinder under the wipe-roll H to the doffer, by which the rovings and lap are caught up together in slivers, which pass in the usual way between the rub-rolls E, by which the rovings are closely pressed into the substance of the slivers, ready to undergo the process of spinning, by which they are thoroughly incorporated together, as shown in Fig. 4.

The length of the rovings introduced into the lap and the distance between them is entirely governed by the duration of and intervals between the movements of the lever N, and these by the distances apart and positions of the pins $m$ acting upon it, which are purposely made irregular.

Having thus described my invention, I beg to state that what I claim is as follows:

1. In combination, the finishing-card cylinder B, the doffer D, a cylinder, G, means for supporting the spool carrying the rovings in frictional contact with the cylinder G, a gear on the shaft D', and an adjustable pin or pins set in said gear, a lever, N, provided with a pawl on one end, its free end projecting into the line of the pin on the gear of the shaft D', and a ratchet-wheel on the shaft of the cylinder G operated by the pawl of the lever N, leading-rolls J J, and a train of gearing between the shaft of cylinder G and said rolls, whereby the movement of the cylinder and rolls is simultaneous, substantially as described.

2. In combination with the finishing-card cylinder B, the frame carrying the same, the leading-rolls J J, and the doffer D, of the wipe-roll H, placed between said leading-rolls and the doffer and in close contact with the cylinder, for the purpose described.

Oxford, Nova Scotia, April 4, A. D. 1887.

JOHN ROBB.

In presence of—
  H. L. HEWSON,
  W. B. CANFIELD.